US008969784B2

(12) United States Patent
Fouquet et al.

(10) Patent No.: US 8,969,784 B2
(45) Date of Patent: Mar. 3, 2015

(54) OPTICAL LENS ASSEMBLY AND OPTICAL DEVICES THEREOF

(75) Inventors: Julie Fouquet, Portola Valley, CA (US); Omid Momtahan, San Jose, CA (US)

(73) Assignee: Avago Technologies General IP (Singapore) Pte. Ltd., Singapore (SG)

(*) Notice: Subject to any disclaimer, the term of this patent is extended or adjusted under 35 U.S.C. 154(b) by 368 days.

(21) Appl. No.: 13/470,920

(22) Filed: May 14, 2012

(65) Prior Publication Data

US 2013/0299682 A1 Nov. 14, 2013

(51) Int. Cl.
*G02B 7/02* (2006.01)

(52) U.S. Cl.
USPC ...... 250/216; 250/221; 362/257; 362/311.01; 362/311.06

(58) Field of Classification Search
CPC ........... F21V 5/007; F21V 5/04; F21V 5/046; F21V 33/00; G02B 7/02; G02B 7/04
USPC .......... 250/216, 221, 551, 239; 362/257, 268, 362/300, 311.01, 311.02, 311.06
See application file for complete search history.

(56) References Cited

U.S. PATENT DOCUMENTS

| | | | |
|---|---|---|---|
| 1,977,689 A | 10/1934 | Muller | |
| 2,254,961 A | 9/1941 | Harris | |
| 3,711,722 A | 1/1973 | Kavanagh | |
| 4,114,592 A | 9/1978 | Winston | |
| 4,753,520 A | 6/1988 | Silverglate | |
| 4,767,172 A | 8/1988 | Nichols et al. | |
| 4,770,514 A | 9/1988 | Silverglate | |
| 5,042,928 A | 8/1991 | Richards | |
| 5,343,330 A | 8/1994 | Hoffman et al. | |
| 5,485,317 A | 1/1996 | Perissinotto | |
| 5,699,201 A | 12/1997 | Lee | |
| 5,894,195 A | 4/1999 | McDermott | |
| 6,320,182 B1 | 11/2001 | Hubble et al. | |
| 6,356,398 B1 | 3/2002 | Otsuki et al. | |
| 6,560,038 B1 | 5/2003 | Parkyn | |
| 7,023,560 B2 | 4/2006 | Hill | |
| 7,710,570 B2 | 5/2010 | Leong et al. | |
| 7,862,221 B2 * | 1/2011 | Park et al. | 362/612 |
| 8,558,161 B2 * | 10/2013 | Ong et al. | 250/216 |
| 2011/0057104 A1 | 3/2011 | Yao et al. | |

FOREIGN PATENT DOCUMENTS

EP 1467224 10/2004
WO WO-2005057128 6/2005

OTHER PUBLICATIONS

Westerhuis, Troy, "The implementation of Proximity Sensors, and Motor Drivers Onto Soccer Playing Robots", http://innovexpo.ltee.uz.edu.au/1999/thesis/westerhu/thesis.pdf Oct. 15, 1999.

* cited by examiner

*Primary Examiner* — Kevin Pyo (57) ABSTRACT

In one embodiment, an optical lens assembly comprising a primary lens and an optical structure located at an outer portion of the lens is disclosed. The primary lens is configured to direct a substantial amount of light to a predetermined first distance whereas the optical structure is configured to direct light towards a second distance that is relatively close to the optical lens assembly compared to the first distance. Other embodiments disclose light-emitting devices and proximity sensors having such an optical lens assembly. Alternative embodiments of the optical lens assembly are disclosed, including but not limited to an optical structure defining an optical surface located at a lens flange and optical structure defining a light guide located at a base portion of the optical lens assembly.

20 Claims, 8 Drawing Sheets

OPTICAL LENS ASSEMBLY AND OPTICAL DEVICES THEREOF

BACKGROUND

Proximity sensors are sensor devices configured to detect presence of nearby objects without any physical contact. For example, proximity sensors are commonly used in electronic gear to turn power-consuming circuitry on or off in response to the proximity sensors detecting something nearby. Use of proximity sensors in such applications may be particularly efficient because they may provide for detecting proximity without having to make physical contact.

A proximity sensor comprises a transmitter and a receiver. An optical lens assembly is coupled to the emitter in order to collimate the radiation to specific directions or distances of interest so that the radiation can be fully utilized for high power efficiency. Similarly, an optical lens assembly may be coupled to the sensor to focus radiation from a specific direction on to the receiver.

The use of an optical lens assembly may increase power efficiency. However, a portion of radiation transmitted through the optical lens assembly, particularly at an outer periphery or the circumference area of the lens, may be lost. It may be desirable to redirect the otherwise lost radiation for other purposes.

Additionally, proximity sensors are usually used to detect an object at a predetermined but comparatively large distance. However, in some applications the proximity sensors may also be required to detect the presence of an object at a location very close to the proximity sensor. This may lead to competing design requirements for optical lenses for proximity sensors.

Proximity sensors may be formed as a single integrated device incorporating optical lens assemblies, an emitter die and a detector die inside a single body. Alternatively, proximity sensors may be assembled from pre-manufactured components. For example, proximity sensors may be assembled from packaged light-emitting devices and packaged detectors. In another example, pre-manufactured optical lens assemblies may be used, rather than being formed from raw material during the manufacturing process. Consequently, a feature of an optical lens assembly found in proximity sensors may be utilized in other optical devices having similar optical components targeted for other applications other than proximity sensing.

BRIEF DESCRIPTION OF THE DRAWINGS

Illustrative embodiments by way of examples, not by way of limitation, are illustrated in the drawings. The embodiments are for illustrative purpose and may not be drawn at actual scale. Throughout the description and drawings, similar reference numbers may be used to identify similar elements.

DETAILED DESCRIPTION

FIGS. 1A-1E illustrate an embodiment of an optical lens assembly 100. The optical lens assembly 100 may be made from glass, epoxy or silicone that is substantially transparent. The optical lens assembly 100 may be configured to direct or redirect or to collimate a radiation, for example visible light emitted by a light-emitting diode (referred hereinafter as LED) or invisible light emitted by an ultra violet or infra red light source. The term "light" or "radiation" may be narrowly interpreted as only a specific type of electromagnetic wave but in this specification, all possible variations of electromagnetic wave should be taken into consideration when a specific type of light or radiation is discussed unless explicitly expressed otherwise. For example, ultra-violet, infra-red and other invisible radiation should be included when considering the term "light" although literally light means radiation that is visible to human eyes.

Figure 1A:
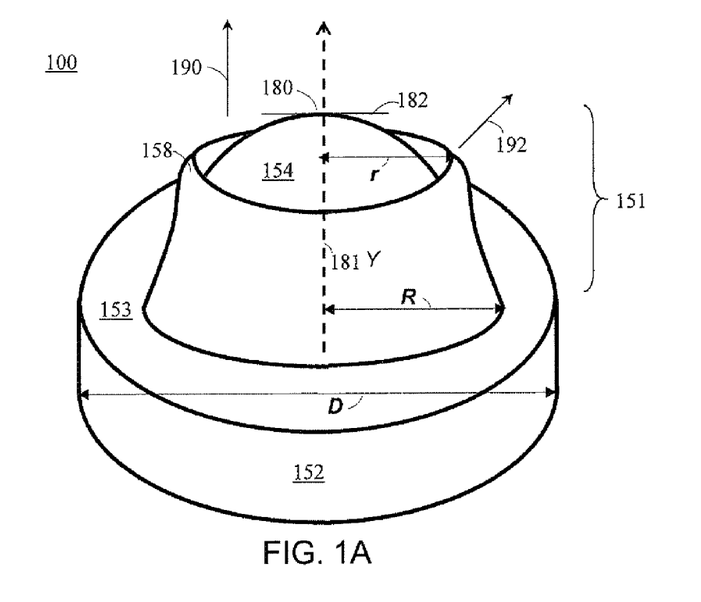
FIG. 1A illustrates a perspective view of an optical lens assembly having an optical structure.

As shown in FIG. 1A, the optical lens assembly 100 comprises a primary lens 154 and an optical structure 158. Optionally, the optical lens assembly 100 may comprise a base portion 152 and a lens flange 153 defined by the base portion 152. The primary lens 154 may be configured to direct substantial amount of radiation being transmitted by the lens assembly 100. For example, in one embodiment, the primary lens 154 may be configured to direct more than approximately 50% of the total radiation going through the optical lens assembly 100. In yet another embodiment, the primary lens 154 may be configured to direct more than approximately 80% of the total radiation going through the optical lens assembly 100.

Referring to FIG. 1A, the primary lens 154 is located at the inner center of the lens assembly 100. The primary lens 154 may define a curvature, for example a convex surface configured to collimate light towards a direction 190. The primary lens 154 may have a vertex 180 with a tangent 182. The tangent 182 may be substantially perpendicular to the direction 190. Hence, the tangent 182 may be substantially parallel to the plane of the base portion 152 as shown in FIG. 1A. In another embodiment, the tangent 182 may be otherwise oriented, in a direction that may be other than parallel to the planar of the base portion 152. In the embodiment shown in FIG. 1A, the primary lens 154 may define a substantial dome shape, and the vertex 180 of the primary lens 154 may represent the top vertex of the dome shape.

Figure 1B:
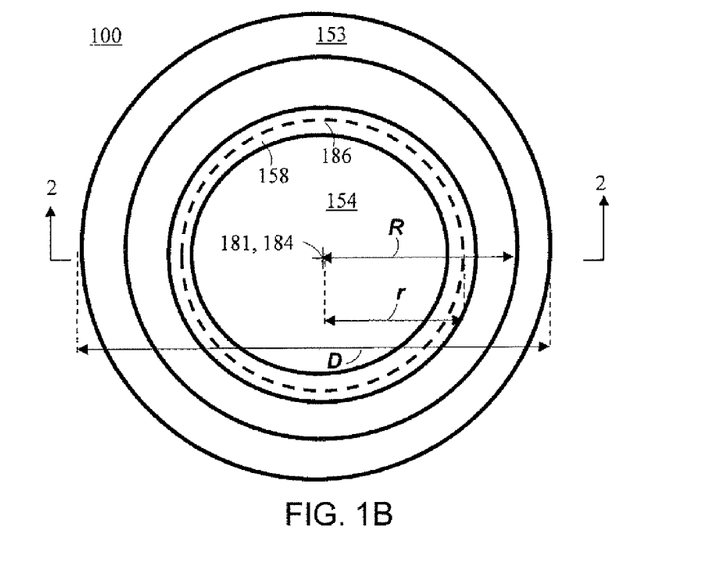
FIG. 1B illustrates a top view of the optical lens assembly.

The primary lens 154 may be substantially axially symmetrical around a center axis 181. Optionally, the entire lens assembly 100 may also be substantially axially symmetrical around the center axis 181. The vertex 180 may lie on the center axis 181 extending in the direction 190. Similarly, as shown in FIG. 1B, the optical structure 158 may be axially symmetrical around a curvature center 184, which may coincide with the center axis 181.

Figure 1C:
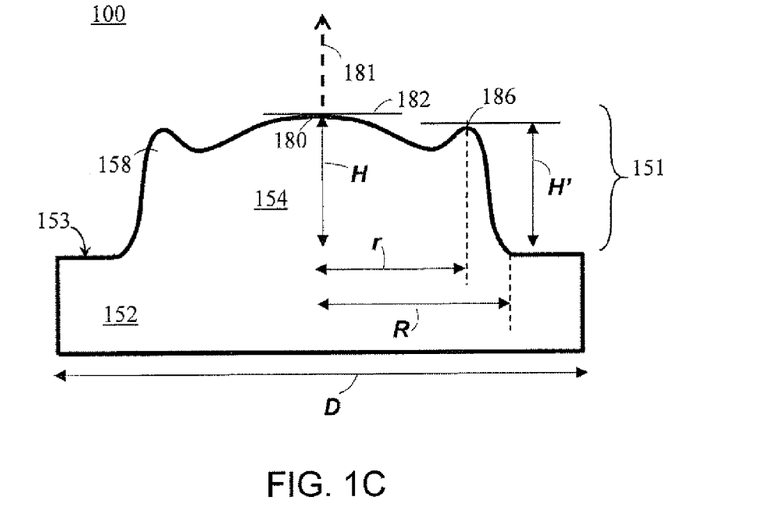
FIG. 1C illustrates a cross-sectional view of the optical lens assembly along line 2-2 shown in FIG. 1B.

As shown in FIG. 1C, the optical structure 158 may be arranged at an outer periphery adjacent to the primary lens 154 and located at a predetermined distance r away from the center axis 181. The predetermined distance r may be measured from a vertex 186, representing the center of the optical structure 158, to the center axis 181 along the direction perpendicular to the center axis 181. The primary lens 154 may direct the radiation less efficiently to the outer periphery area, or at the predetermined distance r, than to the relatively more efficient region around the center axis 181. The optical structure 158, located at the outer periphery, may be configured to direct radiation, which may otherwise be lost, to another secondary location (not shown), which may be of interest in a particular application. Depending on the secondary location (not shown) of interest, the optical structure 158 in embodiment may not be axially symmetrical but merely a curvature (not shown), a linear structure (not shown) or a structure defining other shapes located on one portion of the lens assembly 100 configured to direct light to a second location (not shown). In one embodiment, the curvature (not shown) may be substantially a half circle having a curvature center 184 located away from the center axis 181.

In the embodiment shown in FIG. 1C, the primary lens 154 may have a radius R, which may be a distance measured from the center axis 181 to the curvature as shown in FIG. 1C. The term radius R should not be confused with radius of curvature of a lens 154. The primary lens 154 may have the substantial dome shape. The optical structure 158 may be located at least approximately four tenths of the radius R. By having such distance away from the center, the form factor of the primary lens 154 may be preserved. This aspect may be useful for applications where space may be a constraint. In another embodiment, the predetermined distance r away from the center 181 axis of the primary lens 154 may be at least approximately seven tenths of the radius R so that a substantial amount of radiation transmitted through the lens assembly 100 is directed through the primary lens 154 towards the direction 190.

Figure 1D:
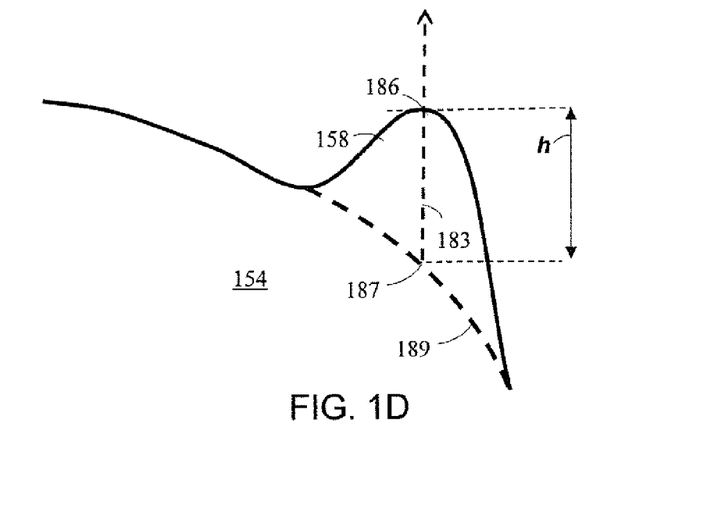
FIG. 1D illustrates a zoom-in view of an optical structure shown in FIG. 1C.

The optical structure 158 may define a protrusion as shown in FIG. 1D. Alternatively, the optical structure 158 may also define some other shape, such as a flat surface or a prism shape that is configurable to direct light. In the embodiment shown in FIG. 1D, the protruded optical structure 158 may extend longitudinally along a second axis 183. The protruded optical structure 158 may have a rounded vertex 186, through which the second axis 183 may extend. The second axis 183 may be substantially parallel to the center axis 181. The protruded optical structure 158 may have a longitudinal dimension h, which may be measured along the second axis 183 from the vertex 186 to a point 187 of the primary lens 154. As shown in FIG. 1D, the point 187 may be located at a surface of the primary lens 154 illustrated along the dotted line 189.

Other design considerations on the form factor of the optical structure 158 may be needed so that the presence of the optical structure 158 does not affect the robustness and the reliability performance of the lens assembly 100. In addition to the above, for some applications it may be desirable that the optical structure 158 does not change the feature size and form factor of the lens assembly 100 significantly. For example, consider one scenario in which the optical structure 158 is protruded substantially beyond the lens assembly 100. The optical structure 158 may break easily and the form factor of the lens assembly 100 will be determined by the optical structure 158, not the primary lens 154.

Another example may relate to the longitudinal dimension h shown in the embodiment in FIG. 1D. If the primary lens 154 has a thickness dimension H extending along the center axis 181 of the primary lens 154, the longitudinal dimension h of the protrusion may be optionally less than approximately half of the thickness dimension H extending along the center axis 181 of the primary lens 154. For example, in another embodiment, the longitudinal dimension h may be 15% of the thickness dimension H.

Consider another example where space may be a constraint. The primary lens 154 may have a thickness dimension H extending along the center axis 181 of the primary lens 154. Another thickness dimension H', which may be oriented substantially parallel to the center axis 181 of the primary lens 154 taken at any point outside the center axis 181, may be optionally less than the thickness dimension H. In the embodiment shown in FIG. 1D, the longitudinal dimension h of the protrusion may be optionally less than approximately a quarter of the thickness dimension H so that the overall form factor of the lens assembly 100 remains substantially similar with or without the optical structure 158.

In another embodiment, the lens assembly 100 may have a diameter D extending substantially perpendicular to the center axis 181 of the optical lens assembly 100. The diameter D should be interpreted broadly and not limited to circular shape lens assembly 100. For example, if the lens assembly 100 has an irregular shape, the diameter D would be the maximum measurement along the direction perpendicular to the center axis 181. In some circumstances such as when the lens assembly 100 comprises a flange 153, the diameter D may be larger than twice the radius R of the primary lens 154. The predetermined distance r, which may extend from the center axis 181 of the primary lens 154 to the vertex 186 of the optical structure 158, may be less than approximately half of the diameter D of the optical lens assembly 100 such that the optical structure 158 may not be protruded beyond the lens assembly 100. In yet another embodiment, the predetermined distance r may be less than approximately 45% of the diameter D of the lens assembly 100.

Figure 1E:
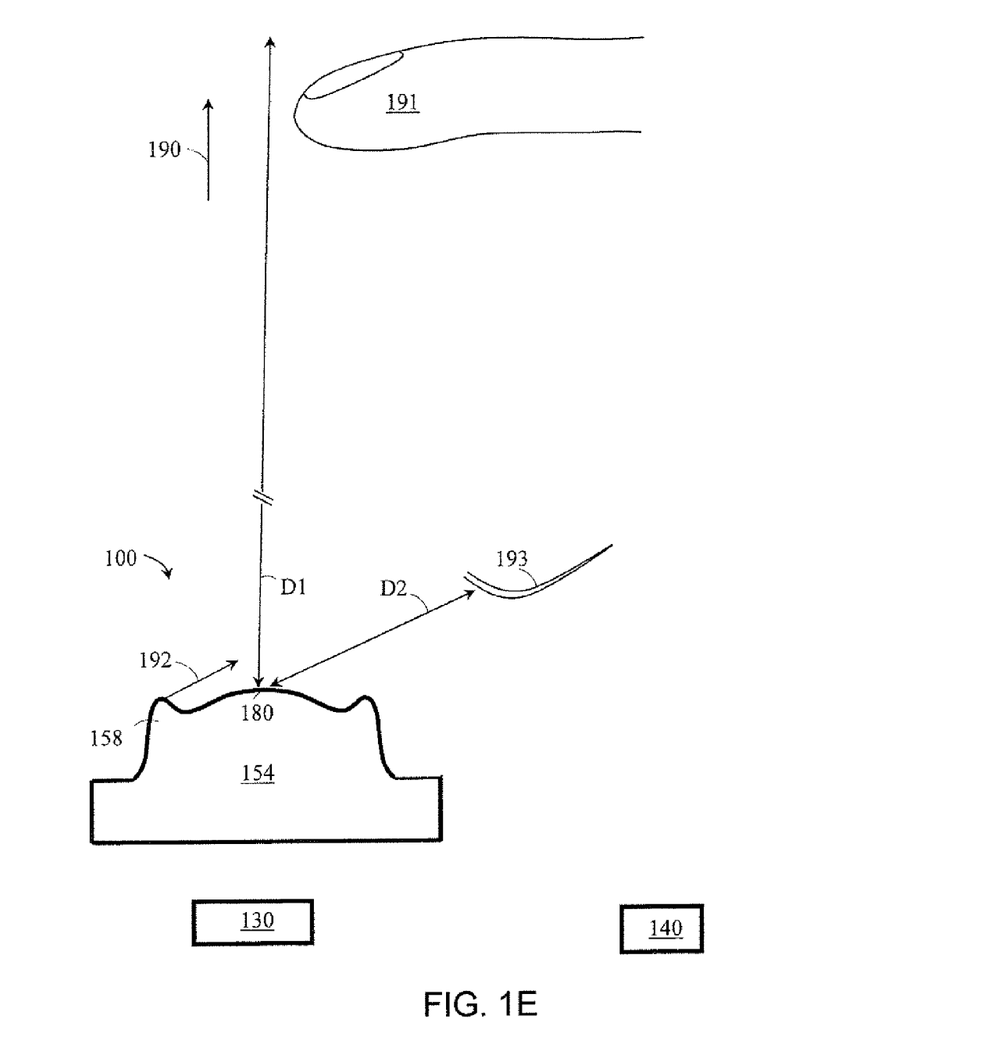
FIG. 1E illustrates how the optical lens assembly is configured to transmit light in proximity sensing.

The optical lens assembly 100 may be configured to direct light into a proximity sensor (not shown) as illustrated in FIG. 1E. The embodiment in FIG. 1E shows several key components such as an emitter 130, a detector 140 and the optical lens assembly 100. The optical lens assembly 100 may be optically coupled to an emitter 130 or a detector 140. The emitter 130 may be configured to emit a radiation, which may include both visible and non-visible light and any other electromagnetic radiation to a first distance D1 in the first direction 190. When an external object 191 is arranged at the first distance D1, the radiation will be reflected towards the detector 140 that is usually arranged adjacent to the emitter 130. The term reflected may include both scattered reflection and specular reflection. The first distance D1 is usually located substantially away from the emitter 130

As the primary lens 154 is configured to direct substantial amount of the radiation to the direction 190 oriented towards first distance D1, there may be relatively less radiation being channeled to certain other directions, for example directions that form more than 40 degrees from the direction 190. The gap may be filled by the optical structure 158. As illustrated in FIG. 1E, while majority of the radiation is directed towards the direction 190, the optical structure 158 is configured to direct the radiation towards a subsequent direction 192 that is oriented towards a second distance D2. In the embodiment shown in FIG. 1E, the further direction 192 may be formed at an angle more than 40 degrees from the direction 190. If an external object 193 is arranged or is present at the second distance D2, the radiation may be reflected to the detector 140.

The subsequent direction 192 and the second distance D2 may be outside the field of view of the primary lens 154. In such cases, the primary lens 154 may not be channeling any radiation towards the subsequent direction 192, nor the second distance D2. However, in another embodiment, the subsequent direction 192 and the second distance D2 may be within field of view of the primary lens 154. The primary lens 154 may direct certain amount of radiation to the direction 192 and the second distance D2 but the radiation may be insufficient or too weak to be detected by the detector 140. In some applications, the external object 193 to be detected at the second distance D2 may be a much smaller object compared to the first distance D1 as illustrated in the embodiment shown in FIG. 1E. The external object 191 to be detected much further away at the first distance D1 may be larger parts of human body such as fingers or hand, but the external object 193 meant to be detected at the second distance D2 may be hair, dirt, dust, or other similar tiny objects located near the lens assembly 100. Detection of dirt or dust may be useful in clean room environment.

In the embodiment shown in FIG. 1E, the first and second distances D1 and D2 may be referenced from the vertex 180 of the primary lens 154. However, the first distance D1 may be substantially larger than the distance D2 such that the reference point may be selected from any part of the lens assembly 100. In one embodiment, the first distance D1 may be at least 10 mm from the vertex 180 of the lens assembly 100 but the second distance D2 may be less than 2 mm from the vertex of the lens assembly 100. In another embodiment, the second distance D2 may be approximately less than 5% of the first distance D1. In yet another embodiment, the second distance D2 may be approximately less than 0.1% of the first distance D1.

As the emitter 130 and the detector 140 are relatively small compared to the first distance D1, the reference point may also be selected from any part of the emitter 130 or the detector 140. For example, the emitter 130 and the detector 140 may have a size less than 1 mm by 1 mm in one embodiment but the first distance D1 is approximately 20 mm whereas the second distance D2 is approximately 1 mm or less. In another embodiment, the distance between the emitter 130 and the detector 140 may be relatively smaller than the first distance D1. The absolute measurement may depend on the reference point located but the first distance D1 may remain relatively larger than the second distance D2 independent from the selection of reference point.

Figure 2:
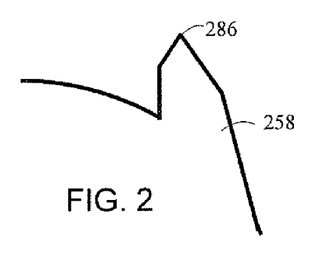
FIG. 2 illustrates an alternative optical structure having pointed edges.
Figure 3:
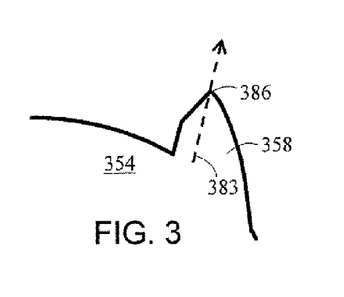
FIG. 3 illustrates an alternative optical structure having a flat surface on one side and a curved surface on the opposite side.

FIG. 2 and FIG. 3 show alternative embodiments of the optical structure 158 shown in FIG. 1C. For example, in FIG. 2 the optical structure 258 comprises flat surfaces. Thus, the vertex 286 of the optical structure 258 may be pointed. On the other hand, the optical structure 358 shown in FIG. 3 has a combination of a curved surface and flat surface on two different sides with a pointed vertex 386. The optical structure 358 may be protruding longitudinally along an axis 383 extending through the vertex 386. The axis 383 of the optical structure 358 may not be parallel to the center axis (not shown) of the primary lens 354.

Figure 4:
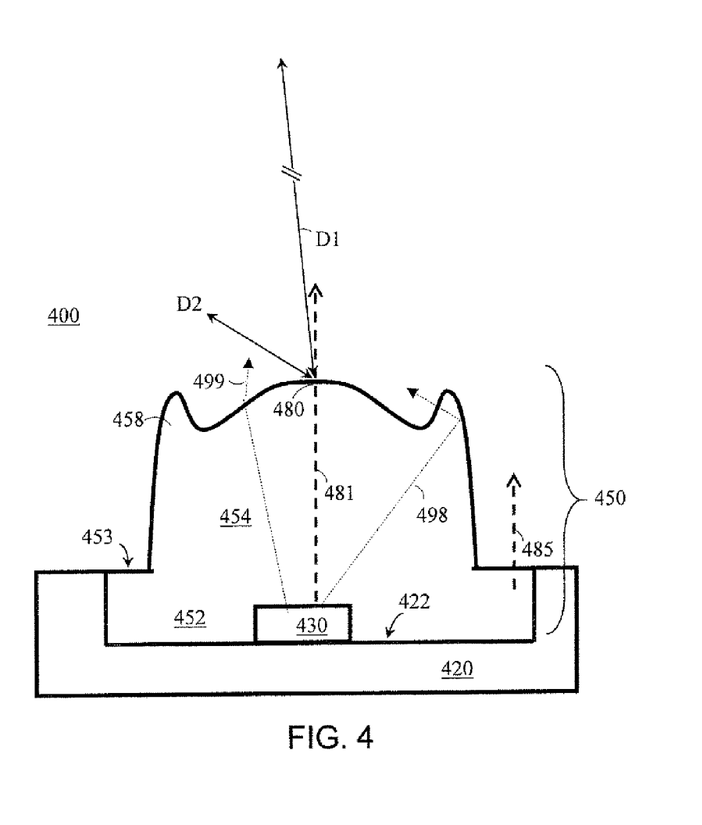
FIG. 4 illustrates a cross-sectional view of a light-emitting device having a lens with an optical structure.

The optical lens assembly 100 shown in the embodiment in FIG. 1 may be used in light-emitting devices, proximity sensors and other optical devices involving both visible and invisible light. FIG. 4 shows an embodiment illustrating a light-emitting device 400 comprising a body 420, an emitter 430 located on a flat surface 422 of the body 420 and a lens assembly 450 for directing light. The emitter 430 may be a semiconductor-based LED or other light source capable of emitting electromagnetic radiation. Although the term "light" is used, other invisible radiation including but not limited to, infrared and ultra-violet radiation should be included as previously explained above.

The body 420 refers to a structure or a base, which may provide structural support for other components of the emitter 430. In the embodiment shown in FIG. 4, the body 420 may be molded from plastic, ceramic or any other material made from an encapsulant initially in liquid form but then cured to solid form towards the end of manufacturing process. In another embodiment, the body 420 may be a flat substrate such as a printed circuit board or other material.

The optical lens assembly 450 may be made from an encapsulant such as silicone, epoxy or other material which may be adapted to encapsulate the emitter 430 when the encapsulant is in liquid form during an early phase of the manufacturing process. The encapsulant may be molded and cured into solid form in a later part of the process. Optionally, the optical lens assembly 450 may be made separately without encapsulating the emitter 430 but optically coupled to the emitter 430. For example, the optical lens assembly 450 may not be in direct contact to the emitter 430 and may be separated from the emitter by an air gap (not shown).

As shown in FIG. 4, the optical lens assembly 450 may comprise a primary lens 454 that defines a dome shape, and an optical structure 458 located at an outer periphery of the lens assembly 450. The primary lens 454 may be substantially axially symmetrical around a center axis 481, which may extend over the vertex 480 of the primary lens 454. Optionally, the lens assembly 450 may further comprise a base portion 452 that may define a lens flange 453. The lens flange 453 may pose optical properties and may or may not be completely covered by the body 420, depending on the embodiment. The lens flange 453 may be adapted to extract light out from the emitter 430 for illuminating an external object (not shown).

The primary lens 454 may be configured to direct a substantial amount of light emitted from the emitter 430 to a first distance D1 as shown by ray 499 whereas the optical structure 458 may be configured to direct light towards a second distance D2 as shown by ray 498. The first distance D1 and the second distance D2 may extend from a common reference point such as the vertex 480 of the lens assembly 450. The shape of the optical structure 458 may be configured such that the light initially directed away from the vertex 480 such as ray 498, is redirected to a second distance D2 close to the lens assembly 450. In some embodiments, the optical structure 458 may have some limitations in directing light much further, because the light being transmitted through the optical structure 458 may have insufficient intensity to be of sufficient beneficial use at such further distance.

The light-emitting device 400 may be used in a configuration for proximity sensor (not shown) wherein a detector (not shown) may be placed adjacent to the light-emitting device 400 such that if an external object (not shown) is arranged at either the first distance D1 or the second distance D2, light emitted from the light-emitting device 400 may be reflected and detected by the detector (not shown). The first distance D1 and the second distance D2 may be measured from a reference point located on any part of the light-emitting device, for example, the flat surface 422 of the light-emitting device.

Figure 5:
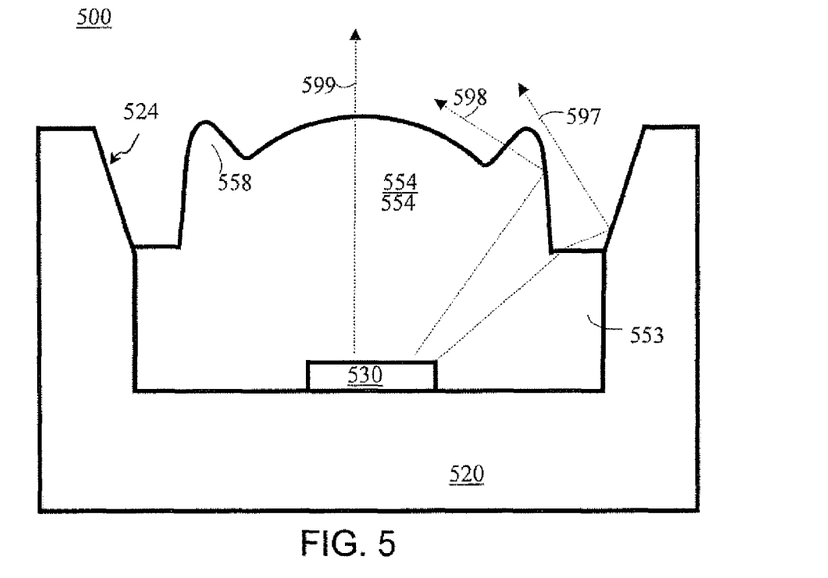
FIG. 5 illustrates a cross-sectional view of a light-emitting device with side walls.

FIG. 5 shows an alternative embodiment of a light-emitting device 500 substantially similar to the light-emitting devices 400 shown in FIG. 4. The light-emitting device 500 comprises a body 520, an emitter 530, a primary lens 554, and an optical structure 558. However, the light-emitting device 500 differs at least in that the body 520 of the light-emitting device 500 may comprise a reflective surface 524. The reflective surface 524 located at the body 520 may be a secondary optical structure for directing light towards a second distance (not shown). The primary lens 554 is configured to direct light such as ray 599 to a first distance (not shown). The optical structure 558 is configured to direct light such as ray 598 to the second distance (not shown). In addition to the optical structure 558, the reflective surface 524 may also be configured to direct light to the second distance (not shown) as illustrated by ray 597. Ray 597 may be transmitted through a lens flange 553, then may be reflected towards the second distance (not shown) by the reflective surface 524.

Figure 6:
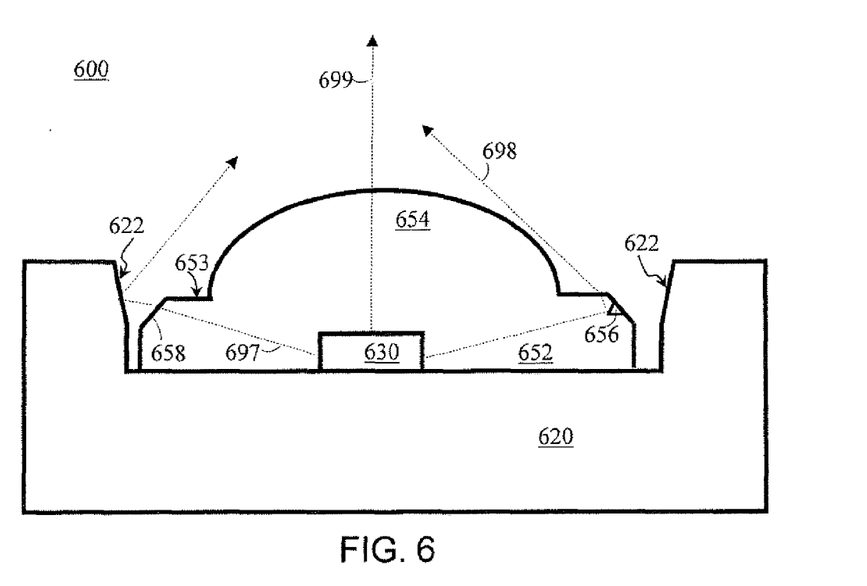
FIG. 6 illustrates a cross-sectional view of a light-emitting device with a lens having an optical structure located on the lens flange.

FIG. 6 shows an embodiment of a light-emitting device 600 comprising a body 620, an emitter 630, a primary lens 654 and a base portion 652 defining a lens flange 653. The light-emitting device 600 may further comprise an optical structure 658 that defines an optical surface. Similar to previous embodiments, the primary lens 654 may be configured to direct light such as ray 699 to a first distance (not shown) whereas the optical structure 658 may be configured to direct light to a second distance (not shown). The optical structure 658 may be in another orientation or form to achieve a similar purpose in another embodiment. For example, the optical structure 658 may not be a flat surface but a curved surface.

The optical structure 658 may be configured to direct light in two different ways. For example, the optical structure 658 may define a surface having a plurality of micro-optic structures 656 that may be configured to direct light towards the second distance (not shown) as illustrated by ray 698. Alternatively, the optical structure 658 may direct light towards a secondary optical structure such as the reflective surface 622. The optical structure 658 may be configured to direct light in such a way that the reflective surface 622 may be configured to reflect the light towards the second distance (not shown) as illustrated by ray 697. In another embodiment, the optical structure 658 may define a texture pattern having some substructure (not shown) configured to direct light.

Figure 7:
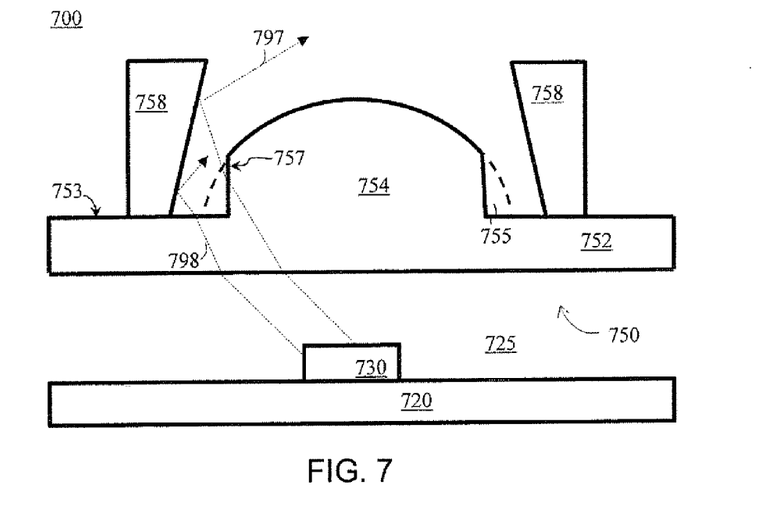
FIG. 7 illustrates a cross-sectional view of a light-emitting device with air gap and optical structures optically coupled to the flange of the lens.

FIG. 7 shows an embodiment illustrating a light-emitting device 700 having an air gap 725. The light-emitting device 700 comprises a body 720 that may be made from a printed circuit board or a lead frame, an emitter 730, an optical lens assembly 750 having a base portion 752 and a primary lens 754. The primary lens 754 defines a substantial dome shape. The base portion 752 may define a lens flange 753 that may pose optical properties. The lens flange 753 may be configured to transmit light in a direction substantially perpendicular to the planar of the body 720. In another embodiment, the lens flange 753 may extract light out from the lens flange 753 to any direction for illumination purposes. The light-emitting device 700 may further comprise an optical structure 758 that may be attached to the lens flange 753. The optical structure 758 may be optically coupled to the lens flange 753. The optical structure 758 may be a portion of the lens assembly 750 molded together with the primary lens 754 and the base portion 752, or alternatively the optical structure 758 may be a portion of the body 720 that may be glued or attached on the lens flange 753.

The optical structure 758 may operate to direct or reflect light transmitted through the lens flange 753 towards a second distance (not shown). A portion 755 of primary lens 754 at the outer perimeter may be removed such that the optical structure 758 may be placed closer to the primary lens 754. In addition, the primary lens 754 may define an optical surface 757. As illustrated by ray 797, the optical surface 757 may be arranged in such an angle that light, which may be transmitted to the optical structure 758 through the optical surface 757, may be directed towards the second distance (not shown). Similarly, as illustrated by ray 798, the optical structure 758 may be configured to direct light reaching the optical structure 758 through the lens flange 753 without going through the primary lens 754 towards the second distance (not shown).

Figure 8:
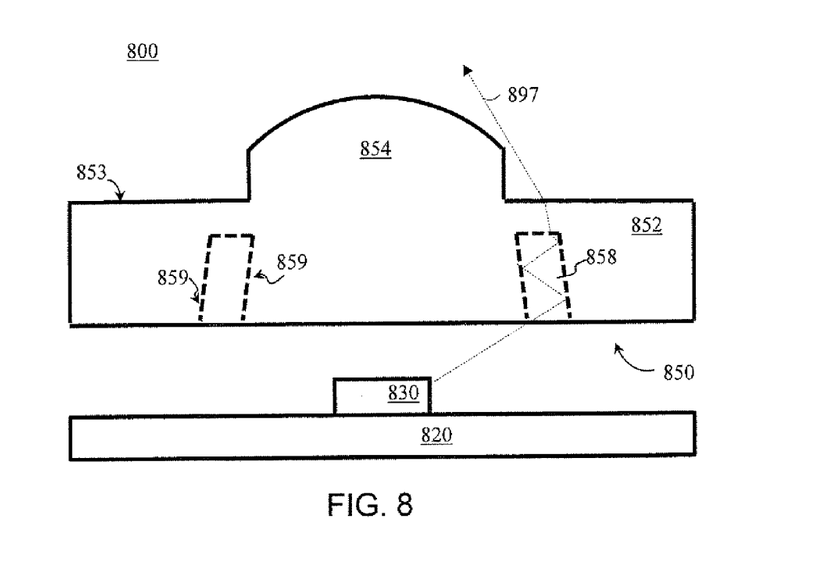
FIG. 8 illustrates a cross-sectional view of a light-emitting device with a light guide located on the base portion.

The embodiment shown in FIG. 8 illustrates an alternative light-emitting device 800 having substrate 820, an emitter 830, and a lens assembly 850 optically coupled to the emitter 830. The lens assembly 850 comprises a primary lens portion 854, a base portion 852, and a lens flange 853. However, optical structures 858 may be formed inside the base portion 852. The optical structure 858 may be light guides, which may be arranged to direct light towards a second distance (not shown) as illustrated by ray 897. The optical structure 858 may be two parallel reflective surfaces 859, which may be defined by a void located at the base portion 852. As shown in the embodiment in FIG. 8, the optical structure 858 may be located at the outer periphery of the lens assembly 850. The optical structure 858 may define a curvature or a circular shape in a top view (not shown) of the light-emitting device 800.

Figure 9:
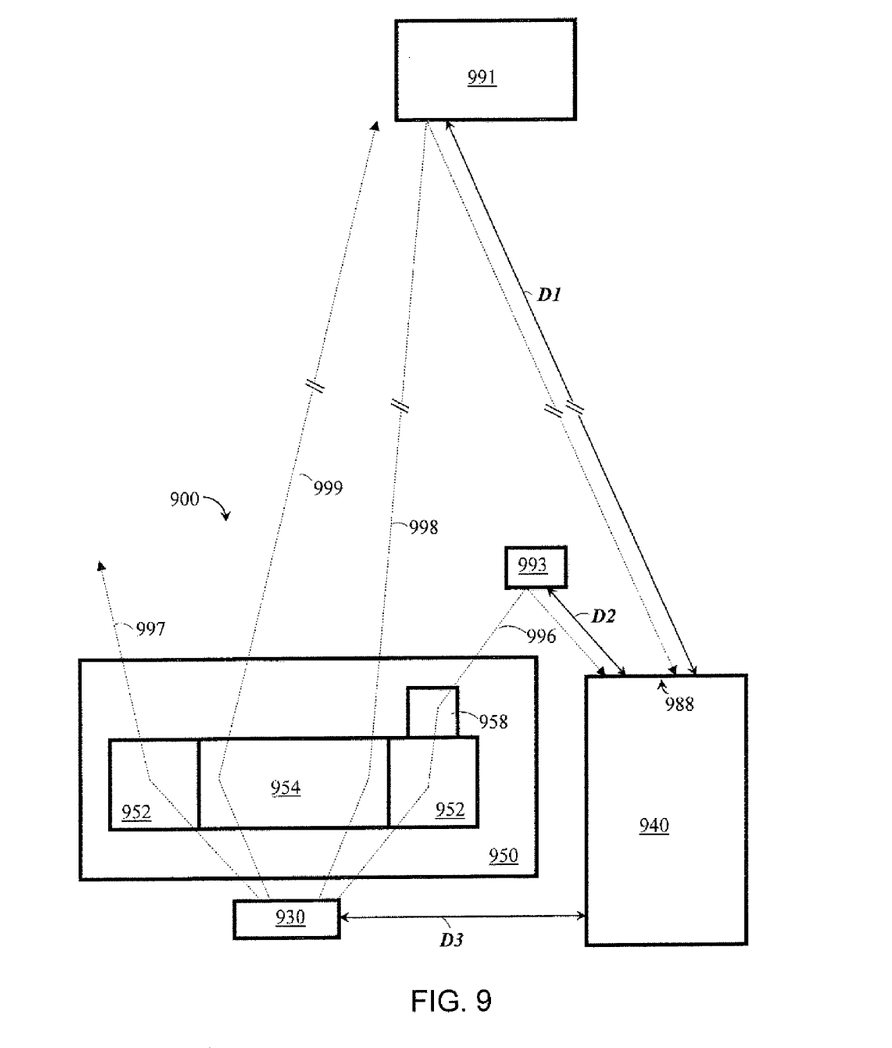
FIG. 9 illustrates a block diagram of a proximity sensor with a lens having center portion and outer portion.

FIG. 9 shows a block diagram of an optical device 900. The optical device 900 may be a proximity sensor, or other devices having an emitter and a detector. In one embodiment, the optical device 900 may be a mobile device such as a mobile phone or a tablet having integrated proximity sensor. In the embodiment shown in FIG. 9, the optical device 900 comprises an emitter 930, a lens assembly 950 coupled to the emitter 930, and a detector 940 configured to detect radiation emitted from the emitter 930. An additional optical lens (not shown) may be coupled to the detector 940. In another embodiment, the optical lens assembly 950 may be coupled to the detector 940 instead of the emitter 930. The optical lens assembly 950 may be one of the optical lens assemblies discussed in other embodiments.

The optical lens assembly 950 may comprise an outer portion 952 and a center portion 954. The outer portion 952 may be lens flange, or outer periphery portion of the lens assembly 950. The center portion 954 may be a primary lens configured to collimate a substantial amount of radiation in a direction oriented towards a first distance D1 that extends from a reference surface 988 as illustrated by ray 999. However, the radiation may be reflected off of an external object 991, when the external object 991 is arranged at a first distance D1, or between a first distance D1 and a second distance D2 that extends from the reference surface 988 as illustrated by ray 998.

The second distance D2 is substantially short compared to the first distance D1 such that the selection of the reference surface 988 may be from any part of the proximity sensor 900. In FIG. 9, the reference surface 988 is selected from a surface of the detector 940, but in another embodiment, the reference surface 988 may be selected from a surface from the lens assembly 950, or a surface of the emitter 930. The distance of D1 and D2, and relative size of the lens assembly 950, the emitter 930 and the detector 940 of the block diagram are not drawn in according to the actual scale. The size of the emitter 930, the detector 940 and the lens assembly 950 may be smaller than the distances D1 and D2. In another embodiment, the size of the emitter 930, the detector 940 and the lens assembly 950 may be smaller than the first distance D1 but comparable to the second distance D2. In addition, the distance D3 between the emitter 930 and the detector 940 may be also relatively small compared to the distance D1.

In many circumstances, radiation entering the outer portion 952 of the lens assembly 950 may be underutilized for the purpose of proximity sensing. For example, the curvature of the lens assembly 950 may be unable to bend a ray enough to reach the first distance D1 nor the second distance D2, as illustrated by ray 997. In another embodiment, the radiation directed to the second distance D2 by the center portion 954 may have a low intensity that is too weak to be detected at the detector 940 unless an additional optical feature such as the optical structure 958 is added to the lens assembly 950. For example, the optical lens assembly 950 may further comprise an optical structure 958 connected to the outer portion 952 of the lens assembly 950 to utilize the radiation such as ray 996.

As illustrated by ray 996 shown in the embodiment in FIG. 9, the radiation entering the optical structure 958 from the outer portion 952 is directed towards a second distance D2 by the optical structure 958 such that when an external object 993 is arranged at the second distance D2, the radiation may be reflected towards the detector 940. The optical structure 958 may be configured to direct light at an angle more towards the detector 940 so that light scattered from closer objects can be detected by the detector 940, rather than only light scattered from objects much farther away. This may be useful for mobile devices such as a mobile phone. For example, a substantial portion of the lens assembly 950 may be configured to direct to a predetermined distance D1 extending a few centimeters from the optical device 900 to detect actual movement of body parts of a user. On the other hand, the optical structure 958 may be configured to detect hair or smaller objects that may be less than 5 mm from the optical device 900.

Figure 10:
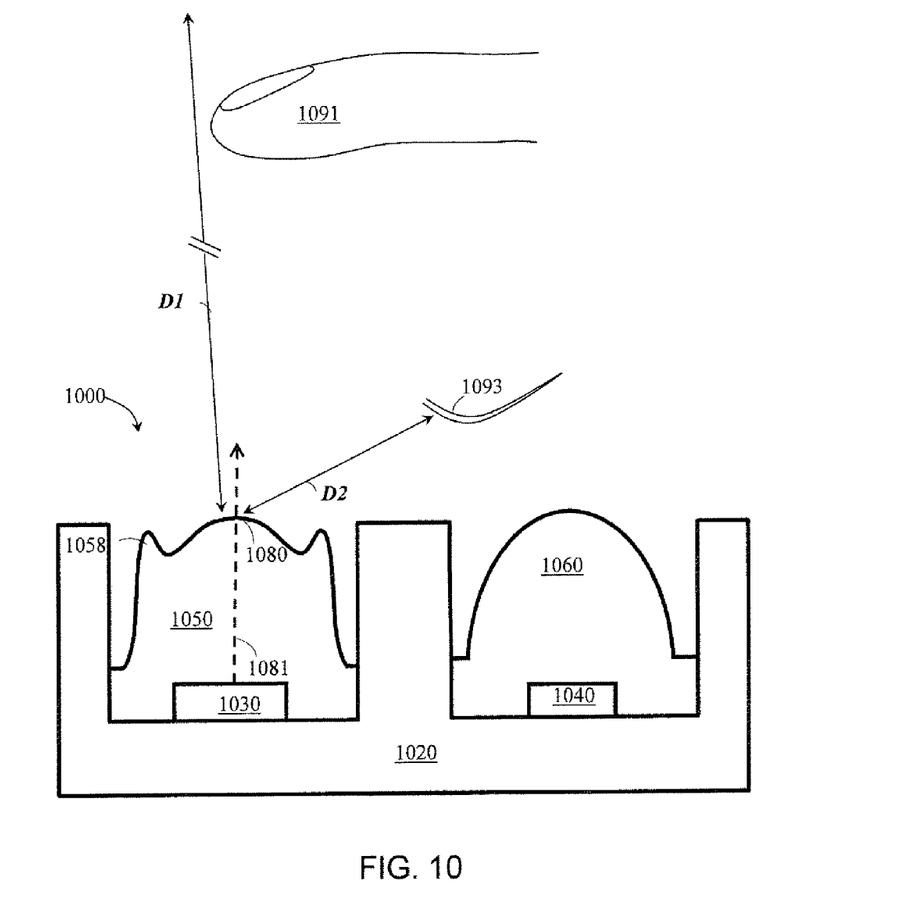
FIG. 10 illustrates a proximity sensor having a lens with an optical structure.

FIG. 10 shows an embodiment of a proximity sensor 1000. The proximity sensor 1000 comprises a body 1020, an emitter 1030, a detector 1040, a first optical lens assembly 1050 coupled to the emitter 1030, and a second optical lens assembly 1060 coupled to the detector 1040. Direct light transmission between the emitter 1030 and the detector 1040 may be blocked. For example, the emitter 1030 and the detector 1040 may be optically separated by the body 1020 such that the detector 1040 may be arranged to receive and detect radiation emitted by the emitter 1030 through reflection from an external object 1091 or 1093 when the external object 1091 or 1093 may be arranged between a first distance D1 and a second distance D2, each extending from a reference point located on the optical lens assembly 1050.

The first optical lens assembly 1050 is configured to direct a substantial amount of the radiation emitted from the emitter 1030 towards a direction oriented towards the first distance D1 substantially away from the reference point. However, an optical structure 1058 located at the outer periphery of the first lens assembly 1050 is configured to direct the radiation towards the direction oriented towards the second distance D2. In FIG. 10, the reference point is located on the vertex 1080 extending along a center axis 1081 of the first lens assembly 1050. In another embodiment, the arrangement of the first optical lens assembly 1050 and the second optical lens assembly 1060 may be reversed. In yet another embodiment, both first and second lens assemblies 1050 and 1060 may comprise the optical structure 1058 having identical or different characteristics.

Different aspects, embodiments or implementations may, but need not, yield one or more of the following advantages. For example, the size and form factor of the lens with and without the optical structures are substantially similar and may enable a drop-in replacement of a lens having optical structures for a device having a lens without the optical structures. Another advantage may be that additional functionality may be enabled by the optical structures channeling the light to a secondary location other than the primary lens without substantially affecting the functionality of the primary lens due to the optical structures.

Although specific embodiments of the invention have been described and illustrated, the invention is not to be limited to the specific forms or arrangements of parts so described and illustrated. It is to be understood that the illustration and description shall not be interpreted narrowly. For example, the alternative embodiments of the optical lens assembly illustrated in light-emitting devices and proximity sensors are not limited for such use, but may be used in a stand-alone optical lens, or used in devices other than proximity sensors. Although light is illustrated, other electromagnetic radiation should be included in potential applications. Combinations and other variation illustrated shall be considered. The embodiments shown in the specification are for illustration purposes and may not be drawn to the actual scale. The scope of the invention is to be defined by the claims appended hereto and their equivalents.

What is claimed is:

1. An optical lens assembly for directing radiation emitted from an emitter, comprising:
    a primary lens having a vertex and a center axis extending through the vertex in a first direction substantially perpendicular to a tangent of the vertex; and
    an optical structure arranged at a predetermined distance away from the center axis, the optical structure being substantially axially symmetrical around the center axis;
    wherein the primary lens is configured to direct a first radiation from the emitter to a first distance from the vertex of the optical lens assembly such that the first radiation is reflected into a detector located adjacent to the emitter when an external object is arranged at the first distance; and
    wherein the optical structure is configured to direct a second radiation from the emitter to a second distance from the vertex of the optical lens assembly such that the second radiation is reflected into the detector when the external object is arranged at the second distance, and wherein the second distance is approximately less than five percent of the first distance.

2. The optical lens assembly of claim 1 wherein:
    the optical lens assembly has a thickness H extending along the center axis; and
    the optical structure comprises a protrusion having a longitudinal dimension h that is less than approximately half of the thickness H of the optical lens assembly.

3. The optical lens assembly of claim 1, wherein the optical structure comprises a protrusion that has a rounded vertex.

4. The optical lens assembly of claim 1, wherein:
    the optical structure comprises a curvature having a curvature center;
    the optical structure is distanced away from the center axis; and the curvature center lies substantially on the center axis of the primary lens.

5. The optical lens assembly of claim 1, wherein the optical structure comprises a flat optical surface configured to direct the radiation.

6. The optical lens assembly of claim 1, wherein the second distance is less than approximately two millimeters.

7. The optical lens assembly of claim 1, wherein:
the primary lens has a radius R; and
the predetermined distance of the optical structure away from the center axis of the primary lens is at least approximately four tenths of the radius R.

8. The optical lens assembly of claim 1, wherein:
the optical structure has a thickness dimension H' that is oriented substantially parallel to the center axis of the primary lens; and
the thickness of the optical lens assembly, H, extending along the center axis of the primary lens is thicker than the thickness dimension H' of the optical structure.

9. The optical lens assembly of claim 1, wherein:
the optical lens assembly has a diameter D extending substantially perpendicular to the center axis of the primary lens; and
the predetermined distance of the optical structure away from the center axis of the primary lens is less than approximately half of the diameter D of the optical lens assembly.

10. A light-emitting device configured for directing light to be reflected off of an external object to a detector located adjacent to the light-emitting device, comprising:
a body;
an emitter attached on a flat surface of the body;
a lens assembly optically coupled to the emitter;
a primary lens of the lens assembly configured to direct a substantial amount of light emitted from the emitter to a first distance extending from a reference point located on the lens, such that light is reflected into the detector when the external object is arranged at the first distance; and
an optical structure located at an outer periphery of the lens assembly;
wherein the optical structure is configured to direct light to a second distance extending from the reference point, such that light is reflected into the detector when the external object is arranged at the second distance, and wherein the second distance is approximately less than five percent of the first distance.

11. The light-emitting device of claim 10, wherein the lens assembly further comprises a base portion substantially encapsulating the emitter connected to the primary lens, wherein the optical structure comprises a light guide positioned inside the base portion of the lens assembly.

12. The light-emitting device of claim 10, wherein:
the lens assembly further comprises a base portion connected the primary lens; and
the optical structure comprises a light guide positioned within the base portion.

13. The light-emitting device of claim 10, wherein the lens assembly further comprises a lens flange connected to the primary lens, and wherein the lens flange is adapted to extract light for illuminating the external object.

14. The light-emitting device of claim 13, wherein the optical structure comprises at least one side wall connected to the lens flange, and wherein the at least one side wall is configured to direct light, incident on the at least one side wall from the primary lens, to a predetermined direction oriented towards the second distance.

15. The light-emitting device of claim 13, wherein the optical structure comprises at least one side wall optically coupled to the lens flange, wherein the at least one side wall is configured to direct light, incident on the at least one side wall from the lens flange, to a predetermined direction oriented towards the second distance.

16. The light-emitting device of claim 10, wherein the primary lens is configured to transmit more than approximately fifty percent of light transmitted through the lens assembly.

17. A proximity sensor, comprising:
a body;
an emitter attached to the body, the emitter being configured to emit a radiation;
a detector configured to detect reflected radiation emitted from the emitter when an external object is arranged between a first distance and a second distance, each extending from a reference point located on the proximity sensor;
an optical lens assembly optically coupled to one of the emitter and the detector;
a primary portion of the optical lens assembly configured to direct the radiation to or from the first distance; and
an optical structure located at an outer periphery of the optical lens assembly, wherein the optical structure is coaxially aligned with the primary portion of the optical lens assembly;
wherein the optical structure is configured to direct the radiation to or from the second distance such that the radiation is reflected into the detector when the external object is arranged at the second distance; and
wherein the second distance extends from the reference point and wherein the second distance is approximately less than five percent of the first distance.

18. An optical device, comprising:
an emitter configured to emit a radiation;
a lens optically coupled to the emitter;
a detector configured to detect the radiation emitted from the emitter, and reflected off of an external object, when the external object is arranged between a first distance and a second distance that extend from a reference surface of the optical device;
a center portion of the lens configured to collimate a substantial amount of radiation in a first direction oriented towards the first distance;
an outer portion of the lens, wherein the radiation entering the outer portion is directed away from the first distance; and
an optical structure connected to the outer portion of the lens, wherein the radiation entering the optical structure from the outer portion is directed towards the second distance oriented in a second direction, wherein the second direction forms an angle more than forty degrees from the first direction.

19. The optical lens assembly of claim 1, further comprising a base portion configured to receive the primary lens on one side, wherein the optical structure comprises a light guide positioned inside the base portion.

20. A proximity sensor, comprising the optical lens assembly of claim 1.

* * * * *